Nov. 2, 1954 R. G. LAUCHER 2,693,078
EXHAUST ORIFICE CONTROL FOR JET ENGINES
Filed March 18, 1949 5 Sheets-Sheet 3
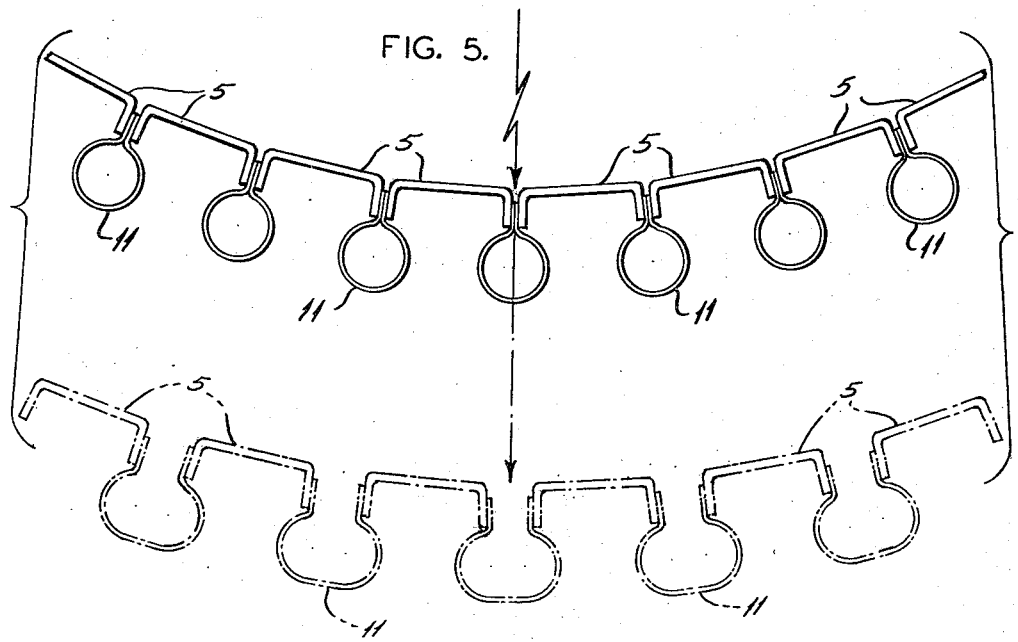
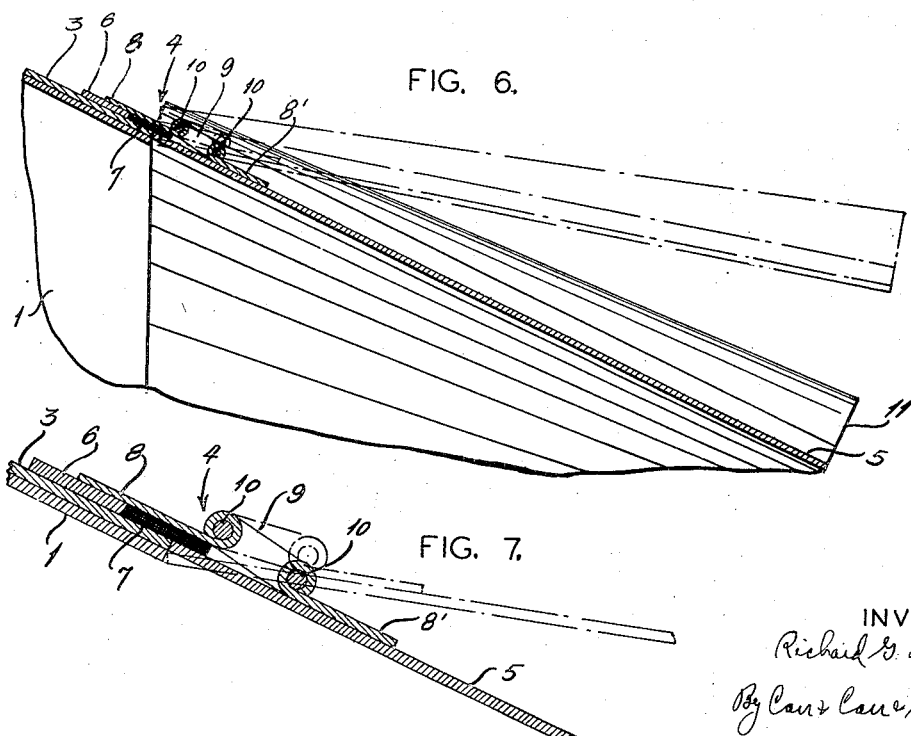
INVENTOR:
Richard G. Laucher,
By Carr & Carr & Gravely,
HIS ATTORNEYS.

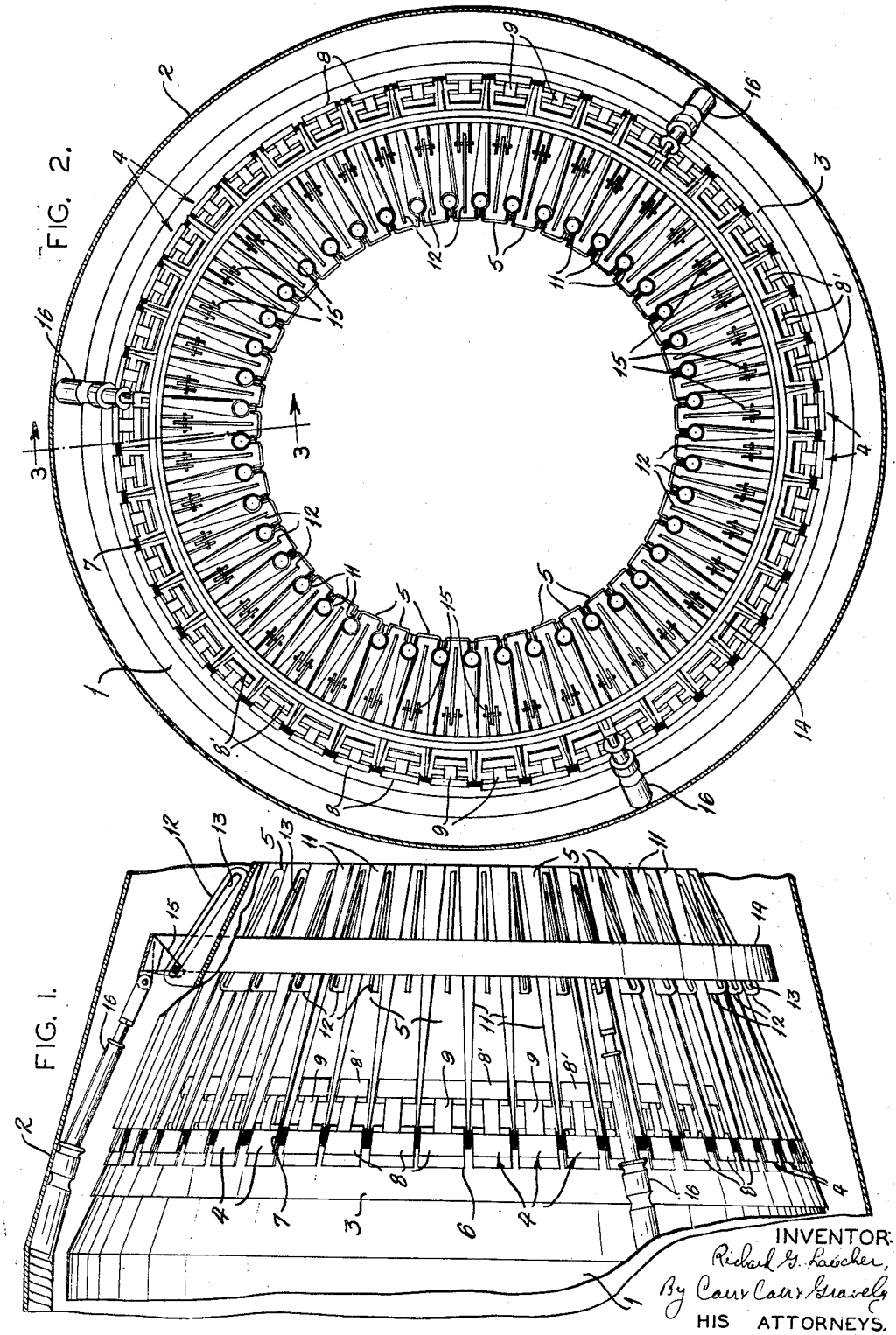

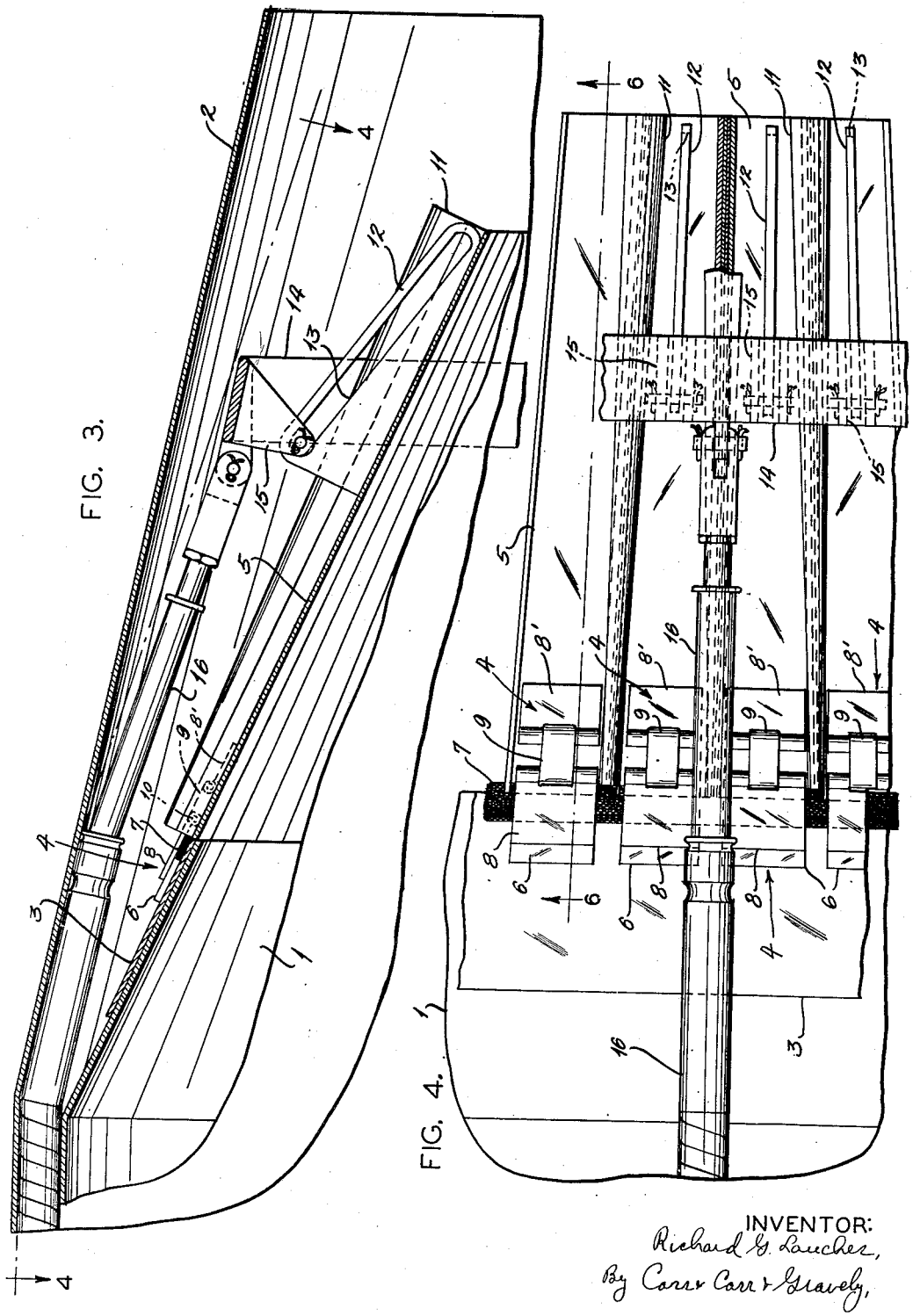

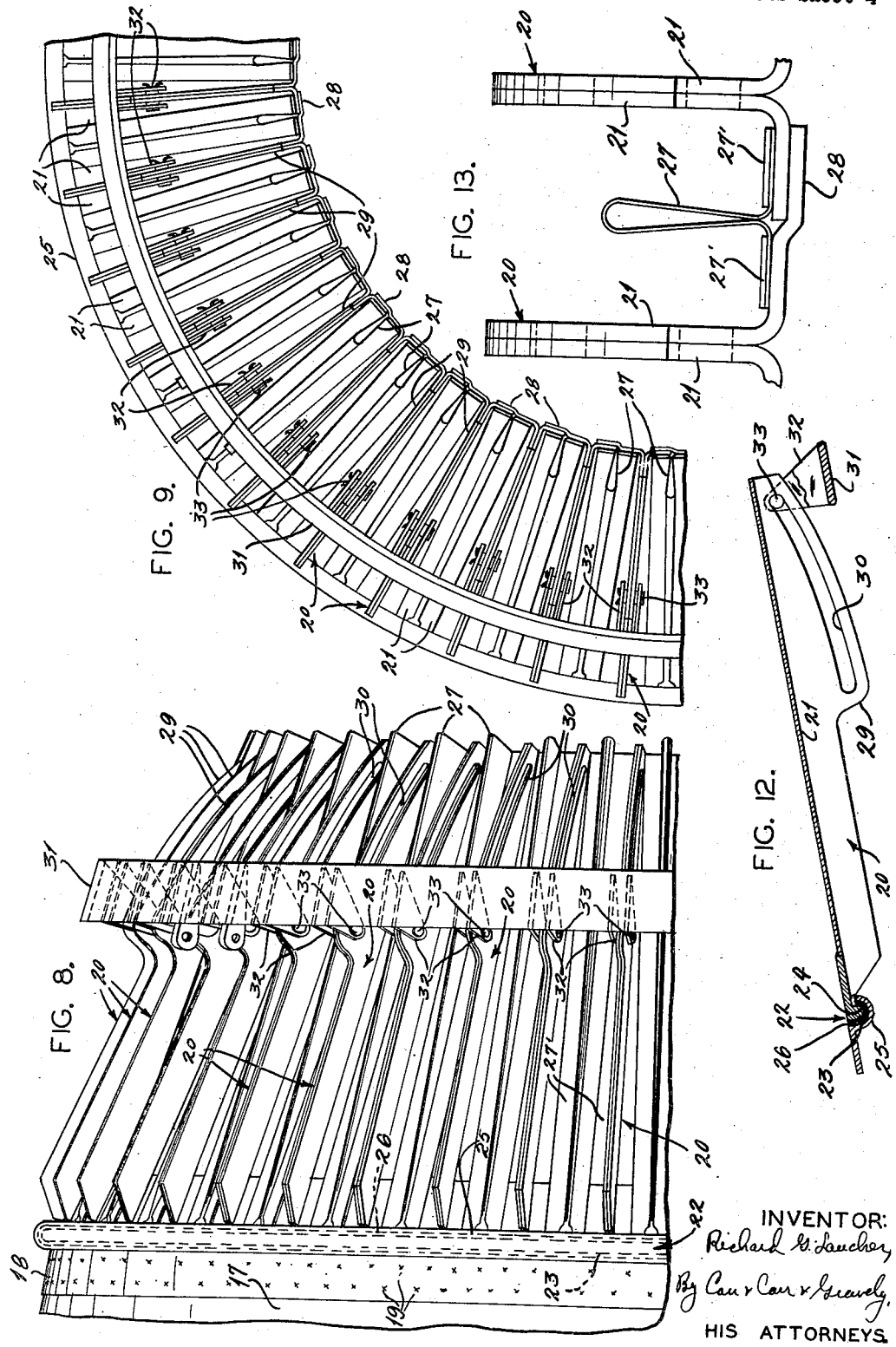

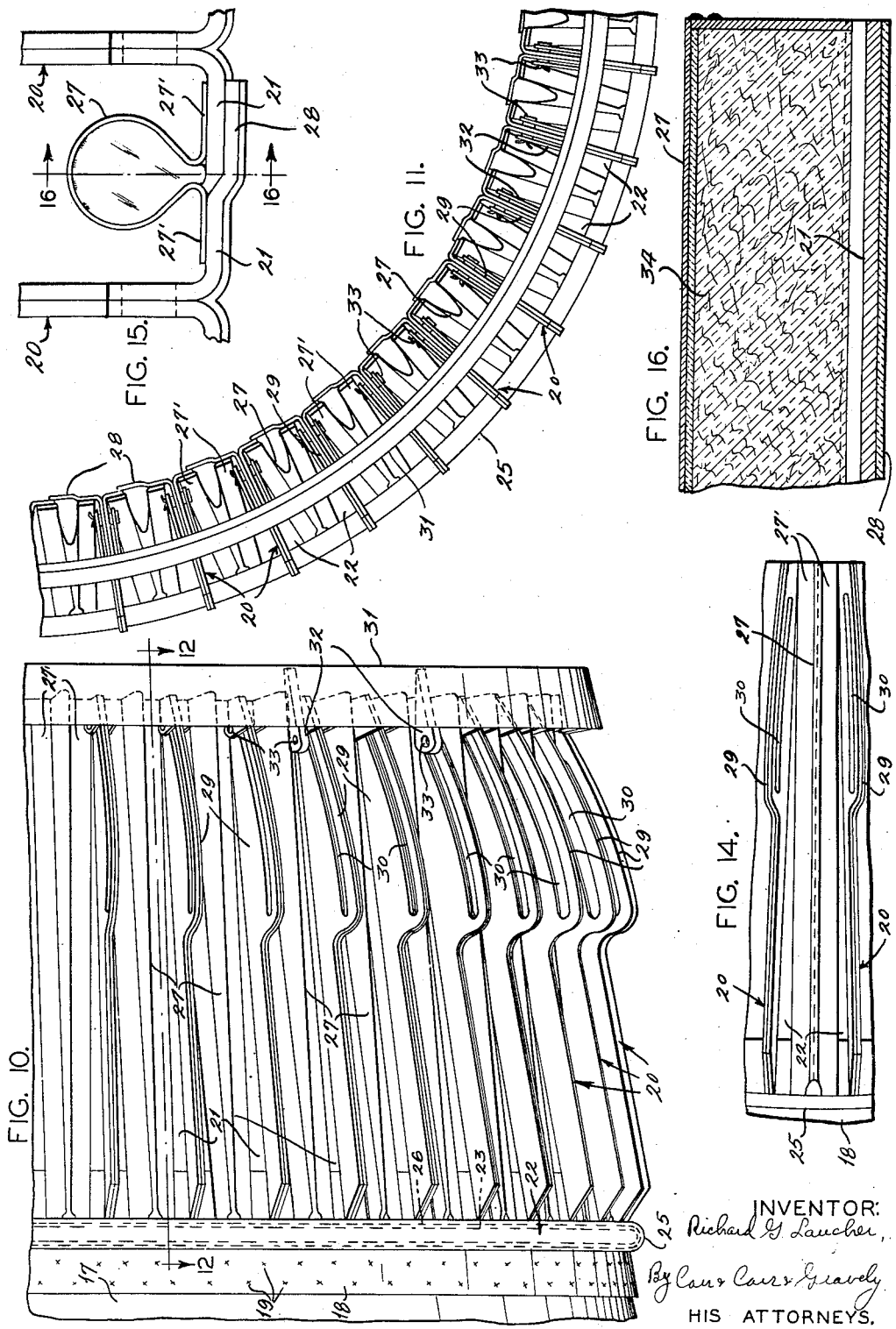

United States Patent Office 2,693,078
Patented Nov. 2, 1954

2,693,078

EXHAUST ORIFICE CONTROL FOR JET ENGINES

Richard G. Laucher, Overland, Mo., assignor, by mesne assignments, to Westinghouse Electric Corporation, a corporation of Pennsylvania Application March 18, 1949, Serial No. 82,059

16 Claims. (Cl. 60—35.6)

This invention relates to jet engines and is more particularly directed to devices for varying the effective area of the exhaust orifices for jet engines.

The principal object of the invention is to produce a control device for quickly varying the effective area of the exhaust orifice for a jet engine.

Another object of the invention is to provide means securable to the member that defines the exhaust orifice for a turbojet engine and is capable of varying the effective area thereof for regulating the thrust developed by the jet engine.

A further object of the invention is to provide an expansible device for controlling the area of the exhaust orifice for a jet engine including improved means for preventing the lateral escape of gases from said device for maintaining optimum engine output.

The invention consists in providing a tubular device one part of which is a continuous ring or annulus that is secured to the body of a jet engine, the other part being a segmental ring comprising a plurality of tapered or wedge-shaped channel members whose larger ends are pivoted to one end of the annulus so that the smaller ends define an exhaust orifice smaller than the orifice in the annulus member and in which the adjacent sides of the channel members are connected together by a tapered contractible resilient member extending the full length of the tapered channel members so that when the channel members are moved toward and away from the longitudinal axis of the tubular device, the effective area of the exhaust orifice will be varied, thereby varying the thrust developed by the jet engine.

The invention also consists in providing a tapered member similar to that described above that is formed by placing the legs of two right angle bar members together and securing them; providing a plurality of such assemblies placed adjacent to each other about the periphery of the annulus; and then connecting a tapered expansible member between the adjoining sides or edges of the tapered members so as to bridge the opening between juxtaposed assemblies.

The invention also consists in providing an extension on one of the legs of each tapered member that covers the space bridged by the contractible member for the purpose of preventing ingress of hot gases therein and in which the surface of the extension that is exposed to hot gases is coated with a suitable ceramic.

The invention also consists in providing an expansible member of circular section that may be filled with glass fiber or shredded asbestos for the purpose of preventing movement of hot gases through the space in the expansible member.

In the drawings:

Fig. 1 is a side elevational view of a device embodying the invention,

Fig. 2 is an end view of the device,

Fig. 3 is an enlarged sectional view taken substantially along the line 3—3 of Fig. 2, Fig. 4 is a view taken substantially along the line 4—4 of Fig. 3, Fig. 5 shows an enlarged end view of a series of tapered members illustrating the exhaust orifice area control wherein the solid lines show the smaller area, the dotted lines showing the larger orifice area, Fig. 6 is a sectional view taken substantially along the line 6—6 of Fig. 4 and illustrating the movement of the hinged member from the smaller to the larger exhaust orifice, Fig. 7 is an enlarged detail view of a portion of the structure illustrated in Fig. 6, Fig. 8 is a side elevational view of a portion of a modified form of exhaust orifice control, Fig. 9 is an end elevational view of the structure illustrated in Fig. 8, Fig. 10 is a side elevational view similar to Fig. 8 but with parts in expanded condition, Fig. 11 is an end view of the expanded structure illustrated in Fig. 10, Fig. 12 is a sectional view taken substantially along the line 12—12 of Fig. 10, Fig. 13 is an enlarged end view of one of the expansible members employed in the construction of Figs. 8 and 11, Fig. 14 is a plan view of the members shown in Fig. 13, Fig. 15 is an end elevational view of a modified expansible member illustrated in the disclosures of Figs. 8 to 11; and Fig. 16 is a sectional view taken substantially along the line 16—16 of Fig. 15.

The numeral 1 designates the body for a jet engine that is circumscribed by a suitable shroud 2. Concentric with and secured to one end of the body 1 is a control device, part of which is made up of a continuous ring or annulus 3 one end of which is secured to the body 1 and the other part is made up of an annularly arranged series of tapered channel members 5, the larger end of each being hinged to the other end of said annulus by hinges 4. The other end of said annulus defines the maximum area of the discharge orifice of the jet engine and, when moved radially relative to the axis of the annulus, the tapered members vary the effective area of the exhaust orifice. Part 8 of each hinge 4 is secured to a spacing ring 6 welded or otherwise secured to annulus 3 and overlies a suitable packing 7 in the form of a wire rope, which rope, as well as the hinge part 8, extends beyond the end of the annulus 3. Part 8' of hinge 4 is secured to the larger end of the tapered channel member 5 and a link 9 is connected between hinge parts 8 and 8'. The connecting link 9 is provided with an eye at each end thereof that fits between the eyes formed on one end of each of the hinge parts 8 and 8', pins 10 being provided for pivotally associating the three parts of each hinge assembly. By arranging hinge part 8 so that it extends beyond the end of annulus 3, leakage of gases between the larger end of each channel member and the annulus is prevented regardless of the pivoted position of each of the channel members 5. Leakage between adjacent channel members 5 is prevented by means of a tapered resilient expansible member 11 having the material between its edges bent to a substantially circular section and whose edges are substantially radial to the circular portion. The edges extend outwardly from the circular portion, the edges being secured to the adjoining side members of each tapered channel and extending the entire length of the channel. The larger end of each of the resilient expansible members is associated with the smaller end of each tapered channel member and conversely the smaller end of the resilient member is associated with the larger end of each tapered channel member. The resilient expansible member 11 is disposed between each of the tapered channel members 5, the purpose of the resilient members being to enable the diameter or area of the outer end of the annularly arranged tapered channel member to move from the full line position to the dotted line position illustrated in Figs. 5 and 6, thereby effectively controlling the exhaust orifice area of the jet engine.

Means for moving channel members 5 from the full line position of Fig. 5 to the dotted line position thereof, comprises a variable force constant lift camming arrangement, one member of which moves parallel to the longitudinal axis of the engine body 1 and annulus 3, the other member thereof being movable at an angle thereto. A cam track means made in the form of a trapezoidal bar 12 is secured to each of the channel members 5 at the smaller end thereof. The bar 12 is provided with a longitudinally extended cam track 13 disposed at an angle to the longitudinal axis of channel member 5. Circumscribing the annularly arranged hinged channel member 5 is a camming or unison ring 14 provided with a plurality of inwardly projecting brackets 15, each of which has a cam follower roller (not shown) that operates in cam track 13. The ring 14 is moved axially by means of a plurality of actuating elements 16 subject to the control of the pilot. As the ring 14 is moved toward the right (Fig. 3) the individual channel and cam track members will be moved from the full line position of Fig. 5 to the dotted line position thereof, or from the full line positions of Figs. 6 and 7 to the dotted line positions of these figures. It is apparent therefore that when channel members 5 assume the dotted line positions, the area of the exhaust orifice of the jet engine is varied by an amount proportional to the change in radius of the area defined by the outer or unhinged ends of the channel members 5 when moving from the full line positions to the dotted line positions, or to any intermediate position.

The modified exit area control device for jet engines illustrated in Figs. 8 through 14, comprises an engine body 17 having a contracted end to which one end of the control device is secured. One part of the control device is a continuous ring or annulus 18 that is secured to the contracted end of body 17 by a series of spot welds 19, thereby preventing leakage of exhaust gases. The contracted end of the body 17 defines the maximum exit orifice area. The other part of the exhaust orifice area device comprises a plurality of annularly arranged T-shaped tapered members 20, the larger end of each being pivoted to the annulus 18. Each of these members is made up of a pair of right angle bars 21, two of whose sides are secured together for forming a flanged T-shaped member. Each of these members is hinged to the annulus 18 at 22, the hinge comprising a bead 23 formed on the wider end thereof and received in an internal groove 24 formed in an upstruck portion 25 of annulus 18, thereby forming a simple hinged connection. The escape of high pressure gases between bead 23 and the upstruck portion 25 is prevented by means of a seal 26 preferably in the form of a tightly woven wire mesh insert. The higher the pressure exerted on the interior of the tapered members, the tighter the seal between bead 23 and the upstruck portion 25. A plurality of these T-shaped members are hinged to the annular body 17, thus controlling the exhaust orifice area and forming the expansible portion of the control device.

The high pressure gases issuing from the jet engine are confined to the desired path of movement defined by the tapered members by means of a tapered resilient expansible member 27 formed in a substantially T-shaped member whose edges 27' are disposed at right angles to the longitudinal axis of the resilient expansible member. The edges are secured to the oppositely extended flanges of the adjoining tapered member 20 for closing the gap therebetween. The escape of high pressure gases between the adjoining T-members is minimized by extending one of the flanges of tapered member 20, as at 28, so that said extension completely covers the gap between adjoining T-members, the extension snugly fitting one of the oppositely extended flanges of the adjacent T-member and disposed on the under side thereof. The extension 28 effectively bars the entrance of gases into the space within the resilient expansible member 27 and prevents its being burned out by gases. When the tapered member 20 is moved for increasing the area of the exhaust orifice, the effective area of the resilient member is increased, and were it not for the presence of the extension 28, a substantial percentage of the gases issuing from the jet engine would enter said connection, thereby reducing the operating efficiency thereof. The more firmly the extension 28 contacts the flanges on member 20, the greater the operating efficiency of the control device.

Means have been provided for definitely controlling the effective area of the exhaust orifice which comprises an enlargement 29 formed on one end of the rib on each of the T-shaped tapered members. The enlargement is provided with a curvilinear cam track 30 near the unpivoted end of the tapered member 20. Circumscribing the entire assembly is a cam or unison ring 31 provided with a plurality of inwardly extending brackets 32 having cam rollers 33 rotatably supported thereon. Preferably, there is one bracket for each of the enlargements 29, the cam rollers 33 sliding in the curved track 30. Means similar to that of operating members 16 described in connection with Figs. 1 through 7, may be provided for moving the unison ring parallel to the longitudinal axis of the control device, thereby moving the tapered member 20 and the resilient expansible members 27 inwardly and outwardly for the purpose of varying the effective exhaust orifice area.

The cam construction described in connection with the modified structure, has certain advantages over that described in connection with Figs. 1 through 7, the latter structure moving the tapered members with a variable force by reason of the fact that the cam tracks therein are of a constant lift type. In the modified construction there is a constant inward and outward force imposed on the several tapered members, resulting in a variable rate of inward and outward movement when moving the tapered members from the full to the dotted line position of Fig. 12, or from the open and closed positions illustrated in Figs. 6 through 11.

Figs. 15 and 16 illustrate a modified construction of the resilient member connected between the tapered T-members 20 or tapered members 5. In the construction of Figs. 8 through 11, the connection is substantially T-shaped and opens to a triangular shape when the control device is moved from vertical to fully open condition. The structure shown in Fig. 15 has a circular section connecting member between the adjoining T sections that retains its substantially circular shape when the device is moved from restricted to fully open condition, as in the case of the resilient member 11. In order to extend the life of the tapered T members 20, the channel members 5 and the resilient connection therebetween, the interior surface of the connection is lined with a suitable ceramic, as in extension 28, thereby preventing burning of the parts. Any tendency of gases entering the interior of the resilient member is prevented by inserting a spun glass or asbestos material 34 therein. The ends of the resilient connection are provided with suitable closures for retaining the material 34 therein. This material prevents the movement of gases thereinto and increases the over-all efficiency of the control for the exhaust orifice area, as well as increasing the life of the several parts thereof.

The modified form of the invention offers certain operating advantages as follows:

The circular shape of the bore in the control device prevents eddying effects caused by the expansible members in other forms of the invention; lateral leakage is at an irreducible minimum by reason of the extension 28 overlying the gap between the adjoining tapered members; the high pressure acting on extension 28 against the associated angle bar 21; and the boundary losses are reduced because the movement of gases issuing from the engine is not retarded by entering the space between the tapered members 20 and into resilient connections 11 and 27.

It is known in turbo and other jet engine arts that one means of controlling the thrust developed by the engine is by a variation in the area of the exhaust orifice for gases issuing from the engine. The instant device provides means for varying said area while preventing leakage between the individual structural members defining the control device so that a more effective over-all control may be had for the turbojet engine.

The control devices described are equally applicable to the exhaust end of an afterburner that may be applied to jet engines and when applied thereto, operate in the same manner as described above.

What I claim is:

1. A device for controlling the effective area of an exhaust orifice for an aircraft prime mover comprising an annular body; an annulus surrounding said body and securable thereto; a plurality of longitudinally extended members pivotally secured to one end of said annulus and whose unpivoted ends define a substantially circular orifice; an annular camming means operable on each of said longitudinally extended members for pivoting them relative to said body for varying the effective exhaust circular orifice area for the prime mover; and means for moving said camming means parallel to the longitudinal axis of the orifice.

2. A device for controlling the effective area of a circular exhaust orifice for an aircraft prime mover comprising a body for the prime mover, an annulus securable to the prime mover body; a plurality of members hinged to one end of said annulus and whose unhinged ends define a substantially circular orifice; cam track means secured to each of said members; an annular cam simultaneously engaging all of said cam tracks; and means for moving said cam parallel to the longitudinal axis of the device for pivoting said members relative to said annulus for varying the effective circular area of the exhaust orifice for the prime mover.

3. A device for controlling the effective area of an exhaust orifice for an aircraft prime mover comprising an engine body; an annulus fitted over and secured to said body; a plurality of tapered channel shaped members arranged about one end of said annulus; a hinge for connecting each of said tapered members to said annulus; a resilient member of varying cross-section bridging the space between adjoining edges of the tapered members for preventing leakage between said members and for enabling them to move radially inwardly and outwardly; a member having a cam track therein secured to each tapered member; an annular cam circumscribing said tapered members and having means thereon in engagement with each of said cam tracks; and means for moving said ring relative to said cam track members and parallel to the longitudinal axis of the orifice, thereby moving said tapered members for varying the effective area of said orifice.

4. A device for controlling the effective area of an orifice for an aircraft prime mover comprising an engine body for defining an exhaust orifice for the prime mover and having a longitudinal axis; an annulus fitted over and secured to said body; a plurality of tapered channel members arranged adjacent to each other about one end of said annulus; a hinge including a pivot for connecting the larger end of each tapered channel member to said end of said annulus; a tapered resilient member having a substantially circular section and whose edges project away from the cricular section bridging the space between adjoining tapered channel members so that said edges are secured to adjoining sides of said tapered channel members for preventing leakage therebetween, the unhinged ends of said tapered members and connecting resilient members defining an orifice that is smaller than the orifice area in said engine body; a member having cam tracks therein associated with each tapered channel member; an annular cam circumscribing said tapered channel members and in engagement with each cam track; and means for moving said cam parallel to the longitudinal axis of said engine body for moving said tapered channel members about the hinge pivots for varying the effective area of the prime mover discharge orifice.

5. A device for controlling the effective area of an exhaust orifice for an aircraft prime mover comprising an engine body for the prime mover; an annulus circumscribing and secured to said engine body; a plurality of tapered members pivoted to one end of said annulus; means for preventing leakage between said annulus and each of said tapered members; means bridging the space between adjoining tapered members for preventing leakage therebetween; a variable force constant lift cam track means on each tapered member, an annular cam simultaneously engaging each cam track means; and means for moving said annular cam parallel to the longitudinal axis of the device for pivoting each member relative to said annulus, thereby varying the effective area of said orifice.

6. A device for controlling the effective circular area of an exhaust orifice for an aircraft prime mover comprising a body for the prime mover, an annulus securable to the prime mover body; a plurality of tapered members pivoted to said annulus and defining a circular exhaust orifice for said prime mover; means for bridging the space between adjoining tapered members for preventing leakage therebetween including a resilient member of varying cross section for enabling the unpivoted ends of said tapered members to pivot relative to said annulus for varying the effective circular area of the exhaust orifice; annular cam means surrounding said device and movable axially thereof; and cam track means associated with each of said tapered members and in engagement with said cam means, said cam when moved relative to said track means and axially of said device pivoting said tapered members relative to said annulus.

7. A device for controlling the effective area of an exhaust orifice for an aircraft prime mover comprising a body for the prime mover, an annulus securable to the prime mover body; a plurality of tapered members pivoted to said annulus, each comprising a pair of right angle bars two of whose legs are secured together and whose other legs extend therefrom in opposite directions; means for bridging the space between adjoining tapered members for preventing leakage therebetween including a resilient member whose edges are secured to the extended legs of adjoining tapered members and being of varying cross section for enabling the unpivoted ends of said tapered members to pivot relative to said annulus, thereby varying the effective area of the exhaust orifice; annular cam means surrounding said device; cam track means formed on each of said tapered members and in engagement with said cam means, and means for moving said annular cam parallel to the longitudinal axis of the device and relative to said cam track means for pivoting said tapered members relative to said annulus.

8. A device for controlling the effective area of an exhaust orifice for an aircraft prime mover comprising a body for the prime mover, an annulus securable to the prime mover body; a plurality of annularly arranged tapered members whose larger ends are pivoted to said annulus, each tapered member including a pair of right angle bars, one leg of each being secured together for forming a T-shaped member, one side of said T-member being extended to overlie the side of the adjoining tapered member; a T-shaped resilient member of varying cross section bridging the space between adjoining tapered members for preventing leakage therebetween and whose sides are secured to the sides of adjoining tapered members; a cam track formed in each tapered member; an annular cam circumscribing said device and in engagement with each track, and means for moving said annular cam along the longitudinal axis of the device for pivoting said tapered members relative to said annulus for varying the effective area of said exhaust orifice.

9. A device for controlling the effective area of an exhaust orifice for an aircraft prime mover comprising a body for the prime mover, an annulus securable to the prime mover body; a plurality of tapered members whose larger ends are pivoted to said annulus, each tapered member including a pair of right angle bars, one leg of each being secured together for forming a T-shaped member, one side of said T-shaped member being extended to overlie the side of the adjoining tapered member; a resilient member of varying circular cross section bridging the space between adjoining tapered sections for preventing leakage therebetween and whose sides are secured to the sides of said tapered members; a cam track formed in each tapered member; an annular cam circumscribing said device and in engagement with each track, and means for moving said annular cam parallel to the longitudinal axis of the device for pivoting said tapered members relative to said annulus for varying the effective area of said exhaust orifice.

10. A device for varying the effective area of an exhaust orifice for gases derived from an aircraft prime mover comprising a body for the prime mover, an annulus securable to the prime mover body forming the exhaust end of the prime mover; a plurality of T-shaped tapered members pivoted to said annulus and whose unpivoted ends define an orifice that is smaller than the orifice in said engine body; a resilient member bridging the space between said members for preventing leakage therebetween, the sides of the resilient member being secured to the sides of said tapered members; means for preventing ingress of gases into said resilient member; and means for varying the effective area of said exhaust orifice which includes a cam track associated with each T-shaped member and an annular cam movable along the longitudinal axis of the device.

11. A device for varying the effective area of an exhaust orifice for gases derived from an aircraft prime mover comprising a body for the prime mover, an annulus securable to the prime mover body forming the exhaust end of the prime mover; a plurality of tapered members pivoted to said annulus and whose unpivoted ends define an orifice that is smaller than the orifice in said engine body; a resilient member of varying circular cross section bridging the space between adjoining tapered members, the sides of the resilient member being secured to the sides of said tapered members; means for preventing ingress of gases into said resilient member which includes a fibrous non-combustible material filling the space therein; and means for varying the effective area of said exhaust orifice.

12. A device for varying the effective area of an exhaust orifice for gases derived from an aircraft prime mover comprising a body for the prime mover, an annulus securable to the prime mover body; a plurality of tapered members circularly arranged and whose larger ends are pivoted to said annulus; means for bridging adjoining tapered members which includes resilient means of varying cross section; means for preventing ingress of gases into said resilient means which includes extending one side of each tapered member so that it overlies one side of the adjoining tapered member; a ceramic coating on said extended side for preventing oxidizing action of the gases passing through the orifice; and means for varying the effective area of said exhaust orifice.

13. A device for controlling the effective circular area of an exhaust orifice for an aircraft prime mover comprising a body for the prime mover, an annulus securable to the prime mover body; a plurality of tapered members hinged to one end of said annulus and defining a circular exhaust orifice; cam track means associated with each of said members; an annular cam simultaneously engaging all of said cam tracks; and means for moving said cam along the longitudinal axis of the device for pivoting said members relative to said annulus for varying the effective area of the exhaust orifice for the prime mover.

14. A device for controlling the effective area of an exhaust orifice for an aircraft prime mover comprising a body for the prime mover, an annulus securable to the prime mover body; a plurality of tapered members pivoted to said annulus and defining said prime mover exhaust orifice; means for bridging the space between adjoining tapered members for preventing leakage therebetween including a resilient member of varying cross section for enabling the unpivoted ends of said tapered members to pivot relative to said annulus for varying the effective area of the exhaust orifice; means for preventing oxidation of said bridging means; an annular cam means surrounding said device; cam track means associated with each of said tapered members and in engagement with said cam means; and means for moving said cam parallel to the longitudinal axis of the device for pivoting said tapered members relative to said annulus.

15. A device for controlling the effective area of an exhaust orifice for an aircraft prime mover comprising a substantially tubular body; an annulus surrounding said body and secured thereto; a plurality of longitudinally extended members pivotally secured to one end of said annulus; means bridging adjoining tapered members for preventing leakage therebetween; means for preventing oxidation of said bridging means, a cam track means associated with each member; and an annular cam means operable on each of said longitudinally extended members and movable parallel to the longitudinal axis of the device for pivoting them relative to said body for varying the effective exhaust orifice area for the prime mover.

16. A device for controlling the effective area of an exhaust orifice for an aircraft prime mover comprising an engine body for the prime mover; an annulus circumscribing and secured to said engine body; a plurality of tapered members pivoted to one end of said annulus; means for preventing leakage between said annulus and each of said tapered members; means bridging the space between adjoining members for preventing leakage therebetween; a constant force variable lift cam track means associated with each tapered member, an annular cam in engagement with the cam track on each tapered member; and means for moving said annular cam parallel to the longitudinal axis of the device for pivoting each member relative to said annulus, thereby varying the effective area of said orifice.

References Cited in the file of this patent

UNITED STATES PATENTS

| Number | Name | Date |
|---|---|---|
| 157,526 | Leggett | Dec. 8, 1874 |
| 186,310 | Curtis | Jan. 16, 1877 |
| 502,446 | Nottingham et al. | Aug. 1, 1893 |
| 1,120,535 | Pruden | Dec. 8, 1914 |
| 1,177,869 | Kelley | Apr. 4, 1916 |
| 1,985,014 | Bush | Dec. 18, 1934 |
| 2,462,953 | Eaton et al. | Mar. 1, 1949 |
| 2,496,509 | Wolf | Feb. 7, 1950 |
| 2,597,253 | Melchior | May 20, 1952 |

FOREIGN PATENTS

| Number | Country | Date |
|---|---|---|
| 586,571 | Great Britain | Mar. 24, 1947 |
| 588,501 | Great Britain | May 27, 1947 |
| 756,632 | France | Sept. 25, 1933 |
| 335,939 | Italy | Feb. 11, 1936 |